United States Patent
Kishimoto et al.

(10) Patent No.: US 7,435,769 B2
(45) Date of Patent: Oct. 14, 2008

(54) FLAME RESISTANT SYNTHETIC RESIN COMPOSITION

(75) Inventors: Daishiro Kishimoto, Ibaraki (JP); Toru Makino, Fukui (JP); Katsuya Okumura, Fukui (JP); Juji Uchida, Fukui (JP)

(73) Assignees: Sanko Co., Ltd., Kurume-shi, Fukuoka (JP); Nicca Chemical Co., Ltd., Fukui-shi, Fukui (JP)

( * ) Notice: Subject to any disclaimer, the term of this patent is extended or adjusted under 35 U.S.C. 154(b) by 454 days.

(21) Appl. No.: 10/550,014

(22) PCT Filed: Mar. 24, 2004

(86) PCT No.: PCT/JP2004/004037

§ 371 (c)(1),
(2), (4) Date: Sep. 23, 2005

(87) PCT Pub. No.: WO2004/085537

PCT Pub. Date: Oct. 7, 2004

(65) Prior Publication Data

US 2006/0247343 A1 Nov. 2, 2006

(30) Foreign Application Priority Data

Mar. 25, 2003 (JP) .............................. 2003-083408

(51) Int. Cl.
*C08K 5/34* (2006.01)
(52) U.S. Cl. ........................................ 524/94; 524/117
(58) Field of Classification Search ................ 524/117, 524/94
See application file for complete search history.

(56) References Cited

U.S. PATENT DOCUMENTS

| | | |
|---|---|---|
| 4,742,088 A | 5/1988 | Kim |
| 6,403,690 B1 * | 6/2002 | Komori et al. .............. 524/436 |
| 6,720,077 B2 | 4/2004 | Hirai et al. |
| 2002/0155298 A1 | 10/2002 | Hirai et al. |
| 2003/0034482 A1 | 2/2003 | Kinoshita et al. |
| 2003/0193045 A1 | 10/2003 | Takeuchi et al. |
| 2004/0097621 A1 * | 5/2004 | Macdonald et al. ......... 524/117 |

FOREIGN PATENT DOCUMENTS

| | | |
|---|---|---|
| JP | 51-149353 | 12/1976 |
| JP | 2001-122977 | 5/2001 |
| JP | 2001-192565 | 7/2001 |
| JP | 2001-294759 | 10/2001 |
| JP | 2001-316543 | 11/2001 |
| JP | 2001-328994 | 11/2001 |
| JP | 2002-241470 | 8/2002 |
| JP | 2002-275473 | 9/2002 |
| JP | 2003-040897 | 2/2003 |
| JP | 2003-105172 | 4/2003 |
| JP | 2003-306679 | 10/2003 |
| WO | WO 02/18493 | 3/2002 |

OTHER PUBLICATIONS

Xiushan et al., "Hi-activity and Low Molecular Weight of Polyisobutene", Comments and Reviews in C.I., pp. 5-7, Feb. 2001.

* cited by examiner

*Primary Examiner*—Kriellion A Sanders
(74) *Attorney, Agent, or Firm*—Leydig, Voit & Mayer, Ltd.

(57) ABSTRACT

A flame-retardant synthetic resin composition characterized by comprising 1-40 parts by weight of at least one type of organic phosphorus compound represented by the following general formula (1):

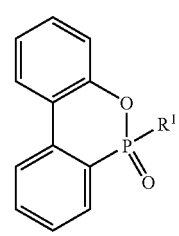

(1)

(wherein $R^1$ represents alkyl, aralkyl, etc.) with respect to 100 parts by weight of a synthetic resin.

14 Claims, No Drawings

FLAME RESISTANT SYNTHETIC RESIN COMPOSITION

TECHNICAL FIELD

The present invention relates to a flame-retardant synthetic resin composition, and to flame-retardant fibers, flame-retardant films and flame-retardant molded articles composed thereof.

BACKGROUND ART

The excellent molding workability, mechanical properties and aesthetic qualities of synthetic resins have led to their wide use and significant importance in molded articles, films, fibers and coating materials. Because synthetic resins are generally flammable, they must be treated to impart flame retardance when used in most electrical and electronic devices, automobiles and the like. Flame retardant agents are commonly used to impart flame retardance to synthetic resins, and known flame retardant agents include organic halogen compounds, halogen-containing organic phosphorus compounds, antimony compounds, inorganic hydroxides, organic phosphorus compounds and the like.

The currently popular halogen compounds such as organic halogen compounds and halogen-containing organic phosphorus compounds are associated with risks of hydrogen halide generation, dioxin production and die corrosion during the processes of heating, melting and incineration in the step of molding synthetic resins, and therefore demand is rising for halogen-free flame retardant agents.

Antimony compounds are also commonly used in combination with halogen compounds, but the harmfulness of antimony compounds themselves has tended to limit their use.

Methods which avoid the use of halogen-based flame retardants employ inorganic hydroxides in their place, but because inorganic hydroxides exhibit flame retardance by the water produced by thermal decomposition, the flame retardant effect is low and large amounts thereof must therefore be added. The result of such large addition often impairs the original properties of the resin.

Another approach to avoiding the use of halogen-based flame retardants is to use organic phosphorus compounds such as triphenyl phosphate (TPP) and tricresyl phosphate (TCP), but such organic phosphorus compounds are unsatisfactory from the standpoint of volatility, sublimation, moisture resistance and heat resistance. In addition, these organic phosphorus compounds are phosphoric acid ester-based flame retardants, and therefore when heated and kneaded with synthetic resins such as polyesters they undergo transesterification whereby the molecular weight of the synthetic resin is significantly lowered and the original properties of the synthetic resin are reduced. Moreover, phosphoric acid ester-based flame retardants themselves gradually undergo hydrolysis by moisture in the air which can lead to production of phosphoric acid, and production of phosphoric acid in a synthetic resin lowers the molecular weight of the synthetic resin and can potentially cause shorts when the resin is used for electrical or electronic applications.

In order to solve these problems of transesterification or hydrolysis when using phosphoric acid ester-based flame retardants, the present applicant has developed the flame retardant thermoplastic resin composition described in Japanese Unexamined Patent Publication No. 2001-294759. However, the organic phosphorus compounds which are actually used in this type of flame-retardant thermoplastic resin composition all have phenolic hydroxyl groups and therefore are not sufficiently inactive with respect to the synthetic resin, while the reduced heat and moisture resistance of the obtained flame-retardant thermoplastic resin composition is another unacceptable problem.

The present applicant has also disclosed, in Japanese Unexamined Patent Publication No. 2002-275473, that flame-retardant fibers with excellent wash resistance can be obtained by adding an organic phosphorus compound-containing flame-retardant coating agent to a fiber material by a post-processing method. However, this publication only describes adding the organic phosphorus compound-containing flame-retardant coating agent to a fibrous material by post-processing, while nothing is mentioned or suggested in regard to including the organic phosphorus compound in the synthetic resin, or the effect thereof on resin materials. In addition, addition of an organic phosphorus compound to a fiber material by post-processing in this manner is still inadequate from the standpoint of uptake efficiency.

DISCLOSURE OF THE INVENTION

Synthetic resins are generally heated during molding and processing steps or during thermosetting in order to obtain the desired molded articles, but in recent years, with the shorter production times and, higher densities of electrical and electronic devices, even higher heat resistance is becoming a requirement for synthetic resins. Demand for recycling of synthetic resins is also increasing, and synthetic resins are desired which exhibit low deterioration and high heat and moisture resistance even with molding under high humidity and high temperature and with repeated thermoforming. Furthermore, since synthetic resins which employ halogen compounds as flame-retardant agents are possible sources of harmful dioxin generation during combustion, the use of halogen-based flame-retardants is also a problem.

Thus, as attention is becoming heightened with respect to the issue of environmental protection, demand is increasing for more stable and safer flame-retardant synthetic resins. In order to achieve one object of the present invention, a compound which is sufficiently inactive with respect to the synthetic resin is used as the flame-retardant agent, which is usually added in a large amount compared to other additives, in order to provide a stable and safe flame-retardant synthetic resin composition with an excellent flame-retardant property, with reduction in heat and moisture resistance adequately prevented, while generating no harmful gases such as dioxin during combustion.

As a result of much diligent research directed toward solving the problems mentioned above, the present inventors have discovered that if the flame-retardant agent kneaded in a synthetic resin is a specific organic phosphonis compound which is chemically inactive and stable, and virtually free of safety concerns and sanitation or environmental problems, it is possible to obtain a flame-retardant synthetic resin composition which is stable and has a low environmental load, generating no harmful gases such as dioxin even during combustion, and which imparts an adequate flame retardant property to the synthetic resin without leading to reduction in heat or moisture resistance, and without problems such as die corrosion during processing and virtually no loss of properties of the synthetic resin during recycling; the present invention has been completed on the basis of this discovery.

Specifically, the flame-retardant synthetic resin composition of the present invention is characterized by comprising 1-40 parts by weight of at least one type of organic phosphorus compound represented by the following general formula (1):

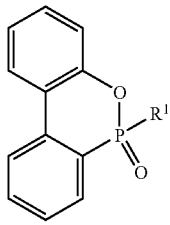

(1)

(wherein R¹ represents alkyl, substituted or unsubstituted aryl, substituted or unsubstituted aralkyl or a group represented by the following general formula (2):

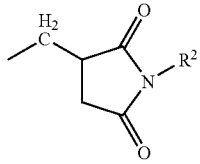

(2)

[wherein R² represents C1-10 alkyl or substituted or unsubstituted aryl.])

with respect to 100 parts by weight of the synthetic resin.

The organic phosphorus compound in the flame-retardant synthetic resin composition of the invention is preferably:

(i) at least one compound selected from the group consisting of 10-methyl-9-hydro-9-oxa-10-phosphaphenanthrene-10-oxide, 10-phenyl-9-hydro-9-oxa-10-phosphaphenanthrene-10-oxide and 10-benzyl-9-hydro-9-oxa-10-phosphaphenanthrene-10-oxide, or (ii) a compound wherein R¹ in general formula (1) is a group represented by the following general formula (2):

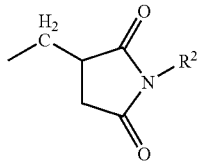

(2)

(wherein R² represents C1-10 alkyl or substituted or unsubstituted aryl).

The synthetic resin in the flame-retardant synthetic resin composition of the invention may be a thermoplastic resin, and as thermoplastic resins there are preferably used one or more selected from the group consisting of polyethylene resins, polypropylene resins, polyisoprene resins, polybutadiene resins, polystyrene resins, high-impact-resistant polystyrene resins, acrylonitrile-styrene resin (AS resin), acrylonitrile-butadiene-styrene resin (ABS resin), methyl methacrylate-butadiene-styrene resin (MBS resin), methyl methacrylate-acrylonitrile-butadiene-styrene resin (MABS resin), acrylonitrile-acrylic rubber-styrene resin (AAS resin), polymethyl (meth)acrylate resins, polyphenylene sulfide resins, polyimide resins, polyether etherketone resins, polysulfone resins, polyarylate resins, polyetherketone resins, polyethernitrile resins, polythioethersulfone resins, polyethersulfone resins, polybenzimidazole resins, polycarboduimide resins, polyamideimide resins, polyetherimide resins, polyamide resins, liquid crystal polymers, polyurethane resins, polycarbonate resins, polyester resins, polyphenylene ether resins and alloyed resins of the above.

The synthetic resin in the flame-retardant synthetic resin composition of the invention may be a thermosetting resin, and as thermosetting resins there are preferably used one or more selected from the group consisting of polyurethane resins, phenol resins, melamine resins, epoxy resins, unsaturated polyester resins, diallyl phthalate resins, bismaleimide-triazine resins and modified polyphenylene ether resins.

The flame-retardant fibers, flame-retardant films and flame-retardant molded articles of the invention are characterized by comprising the aforementioned flame-retardant synthetic resin composition of the invention.

BEST MODE FOR CARRYING OUT THE INVENTION

Preferred embodiments of invention will now be explained in detail. The flame-retardant synthetic resin composition of the invention comprises at least one type of organic phosphorus compound represented by the following general formula (1).

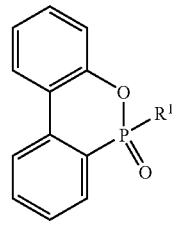

(1)

In this formula, R¹ represents alkyl, substituted or unsubstituted aryl, substituted or unsubstituted aralkyl or a group represented by the following general formula (2).

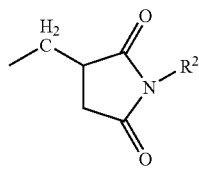

(2)

[wherein R² represents C1-10 alkyl or substituted or unsubstituted aryl.]

The alkyl group for R¹ is preferably C1-22 alkyl, and more preferably C1-12 alkyl. The alkyl group for R² is preferably C1-10 alkyl and more preferably C1-6 alkyl.

As aryl groups for R¹ and R² there may be mentioned phenyl, tolyl, xylyl, biphenyl, naphthyl, anthryl and phenanthryl, among which phenyl is preferred.

As aralkyl groups for R¹ there may be mentioned benzyl, phenylethyl, methylbenzyl and naphthylmethyl, among which benzyl is preferred.

The aforementioned aryl groups and aralkyl groups may be substituted, and as substituents there may be mentioned methyl, ethyl, t-butyl and the like. The number of substituents may be one or greater than one, and in the case of more than one substituent, the substituents may be of different types.

As specific preferred organic phosphorus compounds represented by general formula (1) above to be used for the invention there may be mentioned:

(i) 10-methyl-9-hydro-9-oxa-10-phosphaphenanthrene-10-oxide (Chemical Formula 3):

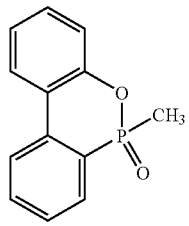

(3)

(ii) 10-phenyl-9-hydro-9-oxa-10-phosphaphenanthrene-10-oxide (Chemical Formula 4):

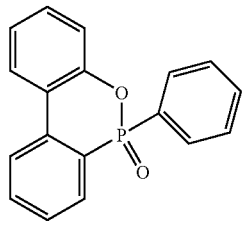

(4)

(iii) ethyl[3-(9,10-dihydro-9-oxa-10-phosphaphenanthrene-10-oxide-10-yl)methyl]-2,5-pyrrolidinedione (Chemical Formula 5):

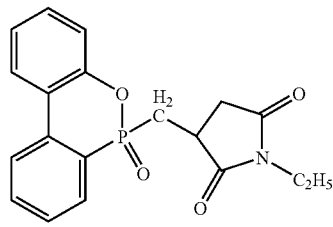

(5)

(iv) 10-benzyl-9-hydro-9-oxa-10-phosphaphenanthrene-10-oxide (Chemical Formula 6):

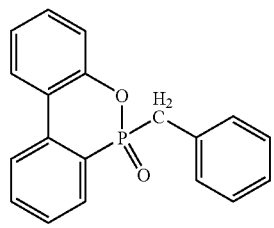

(6)

The organic phosphorus compounds represented by general formula (1) above according to the invention may be used alone or in combinations of two or more different types.

The synthetic resin used for the invention is not particularly restricted, so long as it is a synthetic resin, and thermoplastic resins or thermosetting resins may be employed. As preferred thermoplastic resins for the invention there may be mentioned polyethylene resins, polypropylene resins, polyisoprene resins, polybutadiene resins, polystyrene resins, high-impact-resistant polystyrene resins, acrylonitrile-styrene resin (AS resin), acrylonitrile-butadiene-styrene resin (ABS resin), methyl methacrylate-butadiene-styrene resin (MBS resin), methyl methacrylate-acrylonitrile-butadiene-styrene resin (MABS resin), acrylonitrile-acrylic rubber-styrene resin (AAS resin), polymethyl (meth)acrylate resins, polyphenylene sulfide resins, polyimide resins, polyether etherketone resins, polysulfone resins, polyarylate resins, polyetherketone resins, polyethernitrile resins, polythioethersulfone resins, polyethersulfone resins, polybenzimidazole resins, polycarboduimide resins, polyamideimide resins, polyetherimide resins, polyamides (aliphatic and/or aromatic), liquid crystal polymers, polyurethane resins, polycarbonate resins, polyester resins (polyethylene terephthalate, polypropylene terephthalate, polybutylene terephthalate, polyethylene naphthalate, etc.), polyphenylene ether resins and alloyed resins of the above. As preferred thermosetting resins for the invention there may be mentioned polyurethane resins, phenol resins, melamine resins, epoxy resins, unsaturated polyester resins, diallyl phthalate resins, silicone resins, bismaleimide-triazine resins and modified polyphenylene ether resins. These synthetic resins may be used alone or in combinations of two or more different types.

Flame-retardant properties are particularly required for resins used in fibers, automobiles and household electronic goods, and particularly suited resins are those which can be supplied for injection molding or extrusion molding. Specifically suited are polyester resins, polyamide resins, polycarbonate resins, polyolefin resins, polystyrene resins, epoxy resins and polyurethane resins, which may also be used in combination.

The organic phosphorus compound represented by general formula (1) above for the invention is used at a content of 1-40 parts by weight, and preferably 2-25 parts by weight, to 100 parts by weight of the synthetic resin. If the organic phosphorus compound content is less than 1 part by weight, the obtained synthetic resin composition will have an inadequate flame retardant property and flammable time during the combustion evaluation test. On the other hand, if the organic phosphorus compound content is greater than 40 parts by weight, the physical properties of the obtained synthetic resin composition, including the molding property, bleed property and impact strength, will be reduced and the expected performance of the synthetic resin will not be exhibited.

There are no particular restrictions on the method for mixing the organic phosphorus compound represented by general formula (1) above used for the invention with the aforementioned thermoplastic resin to obtain a flame-retardant synthetic resin composition, so long as the method allows thorough dispersion and mixing, and methods employing a blender, such as a tumbler, ribbon blender, Henschel mixer or the like or heated kneading methods using rolls and kneaders may be used, among which methods using extruders (single-screw, twin-screw and multi-screw extruders) are particularly preferred. Two or more different methods may also be utilized in combination.

The method used for mixing the organic phosphorus compound represented by general formula (1) above used for the invention with the aforementioned thermosetting resin to obtain a flame-retardant synthetic resin composition may be a method of varnishing the thermosetting resin, a curing agent and the organic phosphorus compound represented by general formula (1) (if necessary with compounding agents such as curing accelerators, fillers and the like), after dissolution in a solvent if necessary, or a method of heated kneading using an extruder, kneader, roll or the like for thorough mixing to uniformity.

The flame-retardant resin composition of the invention may also contain flame-retardants other than organic phosphorus-compounds represented by general formula (1), in a range which does not interfere with the object of the invention. As examples of such additional flame-retardant agents there may be mentioned one or more flame-retardant agents selected from among phosphoric acid ester-based flame-retardant agents such as trimethyl phosphate or triphenyl phosphate, resorcinol-bis(diphenyl phosphate), bisphenol A-bis (diphenyl phosphate) and bisphenol A-bis(cresyl phosphate), hydrofluorocarbon-based flame-retardant agents such as tetrafluoroethane polymers or trifluoroethane, and metal hydroxides such as aluminum hydroxide or magnesium hydroxide. When such additional flame-retardant agents are included, the total content is preferably 0.5-20 parts by weight to 100 parts by weight of the synthetic resin.

The flame-retardant synthetic resin composition of the invention may further contain, as necessary and in a range which does not prevent the features of the invention, fillers, antioxidants, thermal stabilizers, ultraviolet absorbers, pigments, coloring agents, plasticizers, lubricants, dispersing agents, nucleating agents, crystallization accelerators, foam stabilizers, antistatic agents and foaming agents, which are ordinarily used as additives in various types of resins. When such additives are included, the total content is preferably no greater than 20 parts by weight to 100 parts by weight of the synthetic resin.

Flame-retardant fibers according to the invention comprise the aforementioned flame-retardant synthetic resin composition of the invention, and the method of fiber formation is not particularly restricted and may be, for example, a melt spinning method.

A flame-retardant film according to the invention comprises the aforementioned flame-retardant synthetic resin composition of the invention, and the method of film formation is not particularly restricted and may be, for example, a biaxial drawing film forming method.

A flame-retardant molded article according to the invention comprises the aforementioned flame-retardant synthetic resin composition of the invention, and there are no particular restrictions on the method of molding; it may be, for example, a method which involves kneading with a twin-screw extruder and formation with an injection molding machine.

EXAMPLES

The present invention will now be explained in greater detail through examples and comparative examples, with the understanding that these examples are in no way limitative on the invention.

Example 1

After adding 5 parts by weight of the organic phosphorus compound of Chemical Formula (3) above to 100 parts by weight of the polycarbonate-based resin PANITE L-1225WP (Teijin Chemical Co., Ltd.), a twin-screw kneading extruder (Berstroff ZE40A) was used for pelleting. The pellets were used to fabricate a test piece with an injection molding machine (N40BII, Japan Steel Works, Ltd.), and the flame-retardant property was evaluated with a ⅛ inch-thick test piece according to Test Method UL-94. The results are shown in Table 1.

Example 2

A test piece was fabricated and its flame-retardant property evaluated in the same manner as Example 1, except that 10 parts by weight of the organic phosphorus compound of Chemical Formula (3) was used instead of 5 parts by weight of the organic phosphorus compound of Chemical Formula (3) The results are shown in Table 1.

Example 3

A test piece was fabricated and its flame-retardant property evaluated in the same manner as Example 1, except that 5 parts by weight of the organic phosphorus compound of Chemical Formula (4) was used instead of 5 parts by weight of the organic phosphorus compound of Chemical Formula (3). The results are shown in Table 1.

Example 4

A test piece was fabricated and its flame-retardant property evaluated in the same manner as Example 1, except that 10 parts by weight of the organic phosphorus compound of Chemical Formula (4) was used instead of 5 parts by weight of the organic phosphorus compound of Chemical Formula (3). The results are shown in Table 1.

Example 5

A test piece was fabricated and its flame-retardant property evaluated in the same manner as Example 1, except that 5 parts by weight of the organic phosphorus compound of Chemical Formula (5) was used instead of 5 parts by weight of the organic phosphorus compound of Chemical Formula (3). The results are shown in Table 1.

Example 6

A test piece was fabricated and its flame-retardant property evaluated in the same manner as Example 1, except that 10 parts by weight of the organic phosphorus compound of Chemical Formula (5) was used instead of 5 parts by weight of the organic phosphorus compound of Chemical Formula (3). The results are shown in Table 1.

Example 7

A test piece was fabricated and its flame-retardant property evaluated in the same manner as Example 1, except that 5 parts by weight of the organic phosphorus compound of Chemical Formula (6) was used instead of 5 parts by weight of the organic phosphorus compound of Chemical Formula (3). The results are shown in Table 1.

Example 8

A test piece was fabricated and its flame-retardant property evaluated in the same manner as Example 1, except that 10 parts by weight of the organic phosphorus compound of Chemical Formula (6) was used instead of 5 parts by weight of the organic phosphorus compound of Chemical Formula (3). The results are shown in Table 1.

Example 9

After adding 10 parts by weight of the organic phosphorus compound of Chemical Formula (3) above to 100 parts by weight of the ABS resin CYCOLAC GS (Ube Cycon Co., Ltd.), a twin-screw kneading extruder (Berstroff ZE40A) was used for pelleting. The pellets were used to fabricate a test piece with an injection molding machine (N40BII, Japan Steel Works, Ltd.), and the flame-retardant property was evaluated with a ⅛ inch-thick test piece according to Test Method UL-94. The results are shown in Table 1.

Example 10

A test piece was fabricated and its flame-retardant property evaluated in the same manner as Example 9, except that 20 parts by weight of the organic phosphorus compound of Chemical Formula (3) was used instead of 10 parts by weight of the organic phosphorus compound of Chemical Formula (3). The results are shown in Table 1.

Example 11

A test piece was fabricated and its flame-retardant property evaluated in the same manner as Example 9, except that 10 parts by weight of the organic phosphorus compound of Chemical Formula (4) was used instead of 10 parts by weight of the organic phosphorus compound of Chemical Formula (3). The results are shown in Table 1.

Example 12

A test piece was fabricated and its flame-retardant property evaluated in the same manner as Example 9, except that 20 parts by weight of the organic phosphorus compound of Chemical Formula (4) was used instead of 10 parts by weight of the organic phosphorus compound of Chemical Formula (3). The results are shown in Table 1.

Example 13

A test piece was fabricated and its flame-retardant property evaluated in the same manner as Example 9, except that 10 parts by weight of the organic phosphorus compound of Chemical Formula (5) was used instead of 10 parts by weight of the organic phosphorus compound of Chemical Formula (3). The results are shown in Table 1.

Example 14

A test piece was fabricated and its flame-retardant property evaluated in the same manner as Example 9, except that 20 parts by weight of the organic phosphonis compound of Chemical Formula (5) was used instead of 10 parts by weight of the organic phosphorus compound of Chemical Formula (3). The results are shown in Table 1.

Example 15

A test piece was fabricated and its flame-retardant property evaluated in the same manner as Example 9, except that 10 parts by weight of the organic phosphorus compound of Chemical Formula (6) was used instead of 10 parts by weight of the organic phosphorus compound of Chemical Formula (3). The results are shown in Table 1.

Example 16

A test piece was fabricated and its flame-retardant property evaluated in the same manner as Example 9, except that 20 parts by weight of the organic phosphorus compound of Chemical Formula (6) was used instead of 10 parts by weight of the organic phosphorus compound of Chemical Formula (3). The results are shown in Table 1.

Example 17

After adding 5 parts by weight of the organic phosphorus compound of Chemical Formula (5) above to 100 parts by weight of the polyamide resin KOBATRON LNB-628 (Mitsubishi Engineering Plastics Co., Ltd.), a twin-screw kneading extruder (Berstroff ZE40A) was used for pelleting. The pellets were used to fabricate a test piece with an injection molding machine (N40BII, Japan Steel Works, Ltd.), and the flame-retardant property was evaluated with a ⅛ inch-thick test piece according to Test Method UL-94. The results are shown in Table 1.

Example 18

A test piece was fabricated and its flame-retardant property evaluated in the same manner as Example 17, except that 10 parts by weight of the organic phosphorus compound of Chemical Formula (5) was used instead of 5 parts by weight of the organic phosphorus compound of Chemical Formula (5). The results are shown in Table 1.

Example 19

A test piece was fabricated and its flame-retardant property evaluated in the same manner as Example 17, except that 5 parts by weight of the organic phosphorus compound of Chemical Formula (6) was used instead of 5 parts by weight of the organic phosphorus compound of Chemical Formula (5). The results are shown in Table 1.

Example 20

A test piece was fabricated and its flame-retardant property evaluated in the same manner as Example 17, except that 10 parts by weight of the organic phosphorus compound of Chemical Formula (6) was used instead of 5 parts by weight of the organic phosphoris compound of Chemical Formula (5). The results are shown in Table 1.

Example 21

After adding 5 parts by weight of the organic phosphorus compound of Chemical Formula (6) above to 100 parts by weight of the polyethylene terephthalate resin TR1400BH (Teijin Chemical Co., Ltd.), a twin-screw kneading extruder (Berstroff ZE40A) was used for pelleting. The pellets were used to fabricate a test piece with an injection molding machine (N40BII, Japan Steel Works, Ltd.), and the flame-retardant property was evaluated with a ⅛ inch-thick test piece according to Test Method UL-94. The results are shown in Table 1.

Example 22

After adding 10 parts by weight of the organic phosphorus compound of Chemical Formula (6) above to 100 parts by weight of the polybutylene terephthalate resin DURANEX 2000 (Polyplastics Co., Ltd.), a twin-screw-kneading extruder (Berstroff ZE40A) was used for pelleting. The pellets were used to fabricate a test piece with an injection molding machine (N40BII, Japan Steel Works, Ltd.), and the flame-retardant property was evaluated with a ⅛ inch-thick test piece according to Test Method UL-94. The results are shown in Table 1.

Example 23

In 30 parts by weight of a methyl ethyl ketone solvent there were uniformly dissolved 100 parts by weight of the epoxy resin EPIKOTE 828 (epoxy equivalents: 190, product of Japan Epoxy Resin Co., Ltd.), 20 parts by weight of the organic phosphors compound of Chemical Formula (3) above, 3.2 parts by weight of a dicyanodiamide curing agent (Nippon Carbide Co., Ltd.) and 0.01 part by weight of a 2-ethyl-4-methylimidazole curing accelerator (2E4MZ, product of Shikoku Corp.). The obtained resin varnish was dried for 4 minutes in a 150° C. circulating hot-air furnace and then heat treated at 170° C.×70 minutes to fabricate a test piece, and the flame-retardant property was evaluated with a ⅛ inch-thick test piece according to Test Method UL-94. The results are shown in Table 1.

TABLE 1

| | Synthetic resin composition mixing ratio (parts by wt.) | | | | | |
|---|---|---|---|---|---|---|
| | | Organic phosphorous compound | | | | |
| Example | Resin | 3 | 4 | 5 | 6 | UL-94 |
| 1 | PC | 100 | 5 | | | V1 |
| 2 | PC | 100 | 10 | | | V0 |
| 3 | PC | 100 | | 5 | | V1 |
| 4 | PC | 100 | | 10 | | V0 |
| 5 | PC | 100 | | | 5 | V1 |
| 6 | PC | 100 | | | 10 | V0 |
| 7 | PC | 100 | | | | 5 V1 |
| 8 | PC | 100 | | | | 10 V0 |
| 9 | ABS | 100 | 10 | | | V1 |
| 10 | ABS | 100 | 20 | | | V0 |
| 11 | ABS | 100 | | 10 | | V1 |
| 12 | ABS | 100 | | 20 | | V0 |
| 13 | ABS | 100 | | | 10 | V2 |
| 14 | ABS | 100 | | | 20 | V1 |
| 15 | ABS | 100 | | | | 10 V1 |
| 16 | ABS | 100 | | | | 20 V0 |
| 17 | PA | 100 | | | 5 | V1 |
| 18 | PA | 100 | | | 10 | V0 |
| 19 | PA | 100 | | | | 5 V1 |
| 20 | PA | 100 | | | | 10 V0 |
| 21 | PET | 100 | | | | 5 V1 |
| 22 | PBT | 100 | | | | 10 V0 |
| 23 | Epoxy | 100 | 20 | | | V0 |

In Table 1, organic phosphorus compounds 3, 4, 5 and 6 represent compounds of Chemical Formulas (3), (4), (5) and (6), respectively. Also in this table, V0-V2 are the flame-retardant standards according to Test Method UL-94, and it was confirmed that the resin compositions of the invention in each example all exhibited an excellent flame retardant property.

Example 24

The flame-retardant synthetic resin composition obtained in Example 17 was used to produce a 50 denier-24 filament yarn by an ordinary spinning/drawing process, and the obtained filament was used to prepare a knitted sample (basis weight: 120 g/m$^2$). The obtained sample was subjected to a flameproof test according to Method D of JIS L 1091. The results are shown in Table 2.

Example 25

A sample was fabricated in the same manner as Example 24 except that the flame-retardant synthetic resin composition obtained in Example 19 was used, and a flameproof test was conducted in the same manner. The results are shown in Table 2.

Example 26

A sample was fabricated in the same manner as Example 24 except that the flame-retardant synthetic resin composition obtained in Example 21 was used, and a flameproof test was conducted in the same manner. The results are shown in Table 2.

TABLE 2

| | Synthesis resin composition mixing ratio (parts by wt.) | | | | Flameproof test | |
|---|---|---|---|---|---|---|
| | | | Organic phosphorus compound | | | Number of flame |
| Example | Resin | | 5 | 6 | Afterflame time (sec) | contacts (times) |
| 24 | PA | 100 | 5 | | 0, 0, 0 | 5, 5, 5 |
| 25 | PA | 100 | | 5 | 0, 0, 0 | 5, 5, 5 |
| 26 | PET | 100 | | 5 | 0, 0, 0 | 5, 5, 5 |

In Table 2, the afterflame time and flame contact time were based on the flame retardant property according to JIS L 1091 (Method D), and each measurement was conducted 3 times. The obtained results confirmed that the resin compositions of the invention for the examples all exhibited excellent flame retardant properties.

Example 27

After adding 5 parts by weight of the organic phosphoris compound of Chemical Formula (6) above to 100 parts by weight of the polybutylene terephthalate resin DURANEX 2000 (Polyplastics Co., Ltd.), a twin-screw kneading extruder (Berstroff ZE40A) was used for pelleting. The pellets were used to fabricate a test piece with an injection molding machine (N40BII, Japan Steel Works, Ltd.). The tensile strength and tensile breaking strain of the obtained test piece, before and after a heat and moisture resistance test in which it was allowed to stand for 10 hours in water vapor at 121° C., 2 atmospheres, were measured according to the test method ISO 527-1,2, and the heat and moisture resistance property was evaluated. The results are shown in Table 3.

Comparative Example 1

A test piece was fabricated and subjected to a heat and moisture resistance test in the same manner as Example 27, except that 5 parts by weight of the phosphoric acid ester-based flame-retardant agent PX-200 (Daihachi Chemical Industry Co., Ltd.) was used instead of 5 parts by weight of the organic phosphorus compound of Chemical Formula (6). The results are shown in Table 3.

Comparative Example 2

A test piece was fabricated and subjected to a heat and moisture resistance test in the same manner as Example 27, except that 5 parts by weight of the organic phosphorus-based flame-retardant agent SANKO-220 (Sanko Co., Ltd.) was used instead of 5 parts by weight of the organic phosphorus compound of Chemical Formula (6). The results are shown in Table 3.

Comparative Example 3

A test piece was fabricated and subjected to a heat and moisture resistance test in the same manner as Example 27, except that no organic phosphorus compound was added. The results are shown in Table 3.

TABLE 3

|  |  | Example 27 | Comp. Ex. 1 | Comp. Ex. 2 | Comp. Ex. 3 |
|---|---|---|---|---|---|
| Before heat/moisture resistance test | Tensile strength (MPa) | 59 | 54 | 58 | 60 |
|  | Tensile breaking strain (%) | 20 | 22 | 20 | 20 |
| After heat/moisture resistance test | Tensile strength (MPa) | 54 | 41 | 50 | 55 |
|  | Tensile breaking strain (%) | 17 | 1 | 15 | 17 |
| After heat/moisture resistance test | Tensile strength retention (%) | 92 | 76 | 86 | 92 |
|  | Tensile breaking strain retention (%) | 85 | 5 | 75 | 85 |

The results shown in Table 3 confirmed that the resin compositions of the invention in the examples had excellent flame-retardant properties while reduction in heat and moisture resistance was adequately prevented.

INDUSTRIAL APPLICABILITY

As explained above, the present invention can provide a stable and safe flame-retardant synthetic resin composition with an excellent flame-retardant property, with reduction in heat and moisture resistance adequately prevented, while generating no harmful gases such as dioxin during combustion, as well as flame-retardant fibers, flame-retardant films and flame-retardant molded articles obtained using the composition.

The invention claimed is:

1. A flame-retardant synthetic resin composition comprising 1-40 parts by weight of at least one type of organic phosphorus compound represented by the following general formula (1):

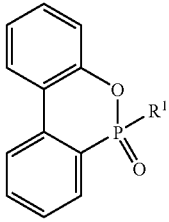

wherein $R^1$ represents a group represented by the following general formula (2):

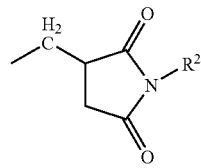

wherein $R^2$ represents C1-10 alkyl or substituted or unsubstituted aryl with respect to 100 parts by weight of the synthetic resin.

2. The flame-retardant synthetic resin composition according to claim 1, wherein said synthetic resin is a thermoplastic resin.

3. The flame-retardant synthetic resin composition according to claim 2, wherein said thermoplastic resin is one or more selected from the group consisting of polyethylene resins, polypropylene resins, polyisoprene resins, polybutadiene resins, polystyrene resins, high-impact-resistant polystyrene resins, acrylonitrile-styrene resin (AS resin), acrylonitrile-butadiene-styrene resin (ABS resin), methyl methacrylate-butadiene-styrene resin (MBS resin), methyl methacrylate-acrylonitrile-butadiene-styrene resin (MABS resin), acrylonitrile-acrylic rubber-styrene resin (AAS resin), polymethyl (meth)acrylate resin, polyphenylene sulfide resins, polyimide resins, polyether etherketone resins, polysulfone resins, polyarylate resins, polyetherketone resins, polyethernitrile resins, polythioethersulfone resins, polyethersulfone resins, polybenzimidazole resins, polycarbodiimide resins, polyamideimide resins, polyetherimide resins, polyamide resins, liquid crystal polymers, polyurethane resins, polycarbonate resins, polyester resins, polyphenylene ether resins and alloyed resins of the above.

4. The flame-retardant synthetic resin composition according to claim 1, wherein said synthetic resin is a thermosetting resin.

5. The flame-retardant synthetic resin composition according to claim 4, wherein said thermosetting resin is one or more selected from the group consisting of polyurethane resins, phenol resins, melamine resins, epoxy resins, unsaturated polyester resins, diallyl phthalate resins, bismaleimide-triazine resins and modified polyphenylene ether resins.

6. A flame-retardant fiber comprising a flame-retardant synthetic resin composition according to claim 1.

7. A flame-retardant film comprising a flame-retardant synthetic resin composition according to claim 1.

8. A flame-retardant molded article comprising a flame-retardant synthetic resin composition according to claim 1.

9. A flame-retardant synthetic resin composition comprising 1-40 parts by weight of at least one type of organic phosphorus compound represented by the following general formula (1):

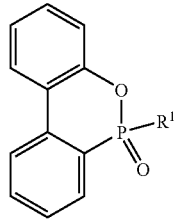

(1)

wherein $R^1$ represents unsubstituted aralkyl or a group represented by the following general formula (2):

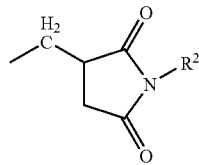

(2)

wherein $R^2$ represents C1-10 alkyl or substituted or unsubstituted aryl, with respect to 100 parts by weight of the synthetic resin, wherein the synthetic resin is one or more selected from the group consisting of polyester resins, polyurethane resins, polycarbonate resins and epoxy resins.

10. The flame-retardant synthetic resin composition according to claim 9, wherein the organic phosphorus compound is an organic phosphorus compound represented by the following chemical formula (5):

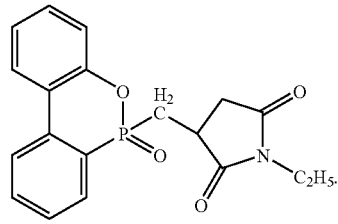

(5)

11. The flame retardant synthetic resin composition according to claim 9, wherein the organic phosphorus compound is an organic phosphorus compound represented by the following chemical formula (6):

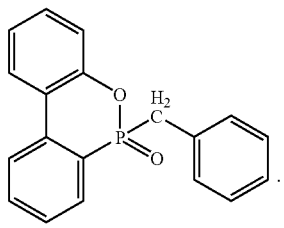

(6)

12. A flame-retardant fiber comprising a flame-retardant synthetic resin composition according to claim 9.

13. A flame-retardant film comprising a flame-retardant synthetic resin composition according to claim 9.

14. A flame-retardant molded article comprising a flame-retardant synthetic resin composition according to claim 9.

* * * * *